(12) United States Patent
Naeni et al.

(10) Patent No.: US 10,613,780 B1
(45) Date of Patent: Apr. 7, 2020

(54) MULTI-NODE REMOVAL

(71) Applicant: Cohesity, Inc., San Jose, CA (US)

(72) Inventors: Sharath Naeni, Santa Clara, CA (US);
Anirvan Duttagupta, San Jose, CA (US); Anubhav Gupta, Sunnyvale, CA (US); Ganesha Shanmuganathan, San Jose, CA (US); Zhihuan Qiu, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/155,796

(22) Filed: Oct. 9, 2018

(51) Int. Cl.
| G06F 11/00 | (2006.01) |
| G06F 3/06 | (2006.01) |
| G06F 11/07 | (2006.01) |
| G06F 11/20 | (2006.01) |
| G06F 11/16 | (2006.01) |

(52) U.S. Cl.
CPC .......... *G06F 3/0632* (2013.01); *G06F 3/0607* (2013.01); *G06F 3/067* (2013.01); *G06F 3/0647* (2013.01); *G06F 11/0709* (2013.01); *G06F 11/1662* (2013.01); *G06F 11/2092* (2013.01); *G06F 11/2094* (2013.01); *G06F 11/2097* (2013.01)

(58) Field of Classification Search
CPC .... G06F 3/0632; G06F 3/0607; G06F 3/0647; G06F 3/067
See application file for complete search history.

(56) References Cited

U.S. PATENT DOCUMENTS

| 9,021,296 B1* | 4/2015 | Kiselev ................... G06F 16/21 714/6.23 |
| 9,407,433 B1* | 8/2016 | Sohi ....................... H04L 9/0861 |
| 10,083,100 B1* | 9/2018 | Agetsuma ........... G06F 11/2094 |
| 2016/0323377 A1* | 11/2016 | Einkauf .............. H04L 67/1076 |
| 2016/0378395 A1* | 12/2016 | Baptist ................ G06F 11/1092 711/165 |
| 2019/0007341 A1* | 1/2019 | Clarke .................... H04L 49/30 |

\* cited by examiner

*Primary Examiner* — Katherine Lin
(74) *Attorney, Agent, or Firm* — Van Pelt, Yi & James LLP (57) ABSTRACT

A method and system for managing a storage cluster is described. An identification of a plurality of nodes of a storage cluster to be removed from the storage cluster is received. It is determined whether to allow the removal of the plurality of nodes. In response to a determination that the removal of the plurality of nodes is allowed, identifications are made of data migrations to be performed to rebalance the data among nodes remaining in the storage cluster after removal of the plurality of nodes. The data migrations are performed. The plurality of nodes are removed from the storage cluster.

26 Claims, 8 Drawing Sheets

MULTI-NODE REMOVAL

BACKGROUND OF THE INVENTION

In a distributed storage system, data from the client's system are stored across a plurality of nodes in a cluster. To provide the desired level of data storage, the nodes in the cluster are actively managed. For example, if a node goes offline during operation, storage operations are directed to the remaining nodes in the cluster. Once the node is online again, the node may participate in storage operations. Similarly, if a node fails, the node is removed and may be replaced. An administrator is also desired to be able to manage the nodes that are part of the cluster. Thus, improved methods and systems for managing nodes in a storage cluster are desired.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and system for managing a storage cluster is described. An identification of a plurality of nodes of a storage cluster to be removed from the storage cluster is received. It is determined whether to allow the removal of the plurality of nodes. In response to a determination that the removal of the plurality of nodes is allowed, identifications are made of data migrations to be performed to rebalance the data among nodes remaining in the storage cluster after removal of the plurality of nodes. The data migrations are performed and the plurality of nodes are removed from the storage cluster.

Figure 1:
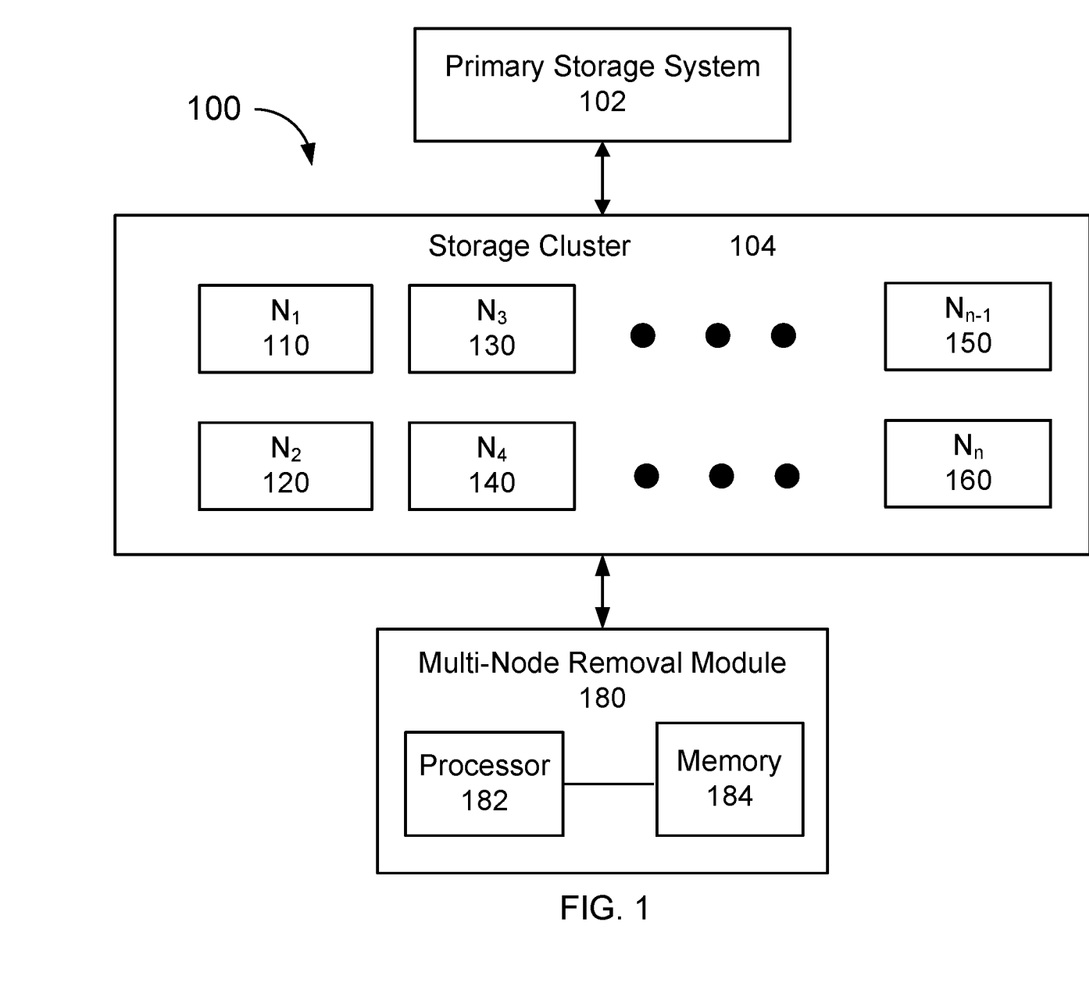
FIG. 1 is a block diagram of an exemplary embodiment of a system for managing distributed storage.

FIG. 1 is a block diagram of system 100 for managing a distributed storage system. System 100 is a secondary storage system including storage cluster 104 and multi-node removal module 180. System 100 is also shown as connected with primary storage system 102, which may be considered to be a client of the secondary storage system. Primary storage system 102 stores file system data. Primary storage system 102 may comprised of one or more servers, one or more computing devices, one or more storage devices, and/or a combination thereof. Primary storage system 102 may be connected with secondary storage system 100 via a network. For clarity, only some components of secondary storage system 100 are shown. Nothing prevents other and/or additional components that are not inconsistent with the method and system described herein from being present in secondary system 100.

Secondary storage system 100 is a storage system that may be configured to backup file system data received from primary storage system 102. Secondary storage system 100 may protect a large volume of applications while supporting tight business requirements (recovery time objective (RTO) and recovery point objective (RPO)). Secondary storage system 104 may unify end-to-end protection infrastructure including target storage, provide backup, replication of data, disaster recover, and/or cloud tiering. Secondary storage system 100 may provide scale-out, globally deduped, highly available storage to consolidate all secondary data, including backups, files, and test/dev copies. Secondary storage system simplifies backup infrastructure and eliminates the need to run separate backup software, proxies, media servers, and archival. Secondary storage system 100 may be fully integrated with a virtual machine (VM) centralized management tool, such as vCenter, and an applications programming interface (API) for data protection. Secondary storage system may reduce the amount of time to perform a RPOs and support instantaneous RTOs by creating a clone of a backup VM and running the VM directly from secondary storage system 100. Secondary storage system 100 may integrate natively with one or more cloud servers. This eliminates the need to use tape archives by using one or more cloud servers for long-term data archival.

Storage cluster 104 of secondary storage system 100 includes a plurality of nodes $N_1$ through $N_n$. For simplicity, only nodes 110, 120, 130, 140, 150 and 160 are labeled. Also shown is multi-node removal module 180. Multi-node removal module 180 may be part of a larger file system manager (not explicitly shown) that manages storage cluster 104 and secondary storage system 100. Multi-node removal module 180 includes at least one processor 182 and memory 184. In addition to being automatically controlled, the storage cluster 104 may be managed by an administrator or other authorized user. Via multi-node removal module 180, the administrator may select and concurrently remove multiple nodes.

Figure 2:
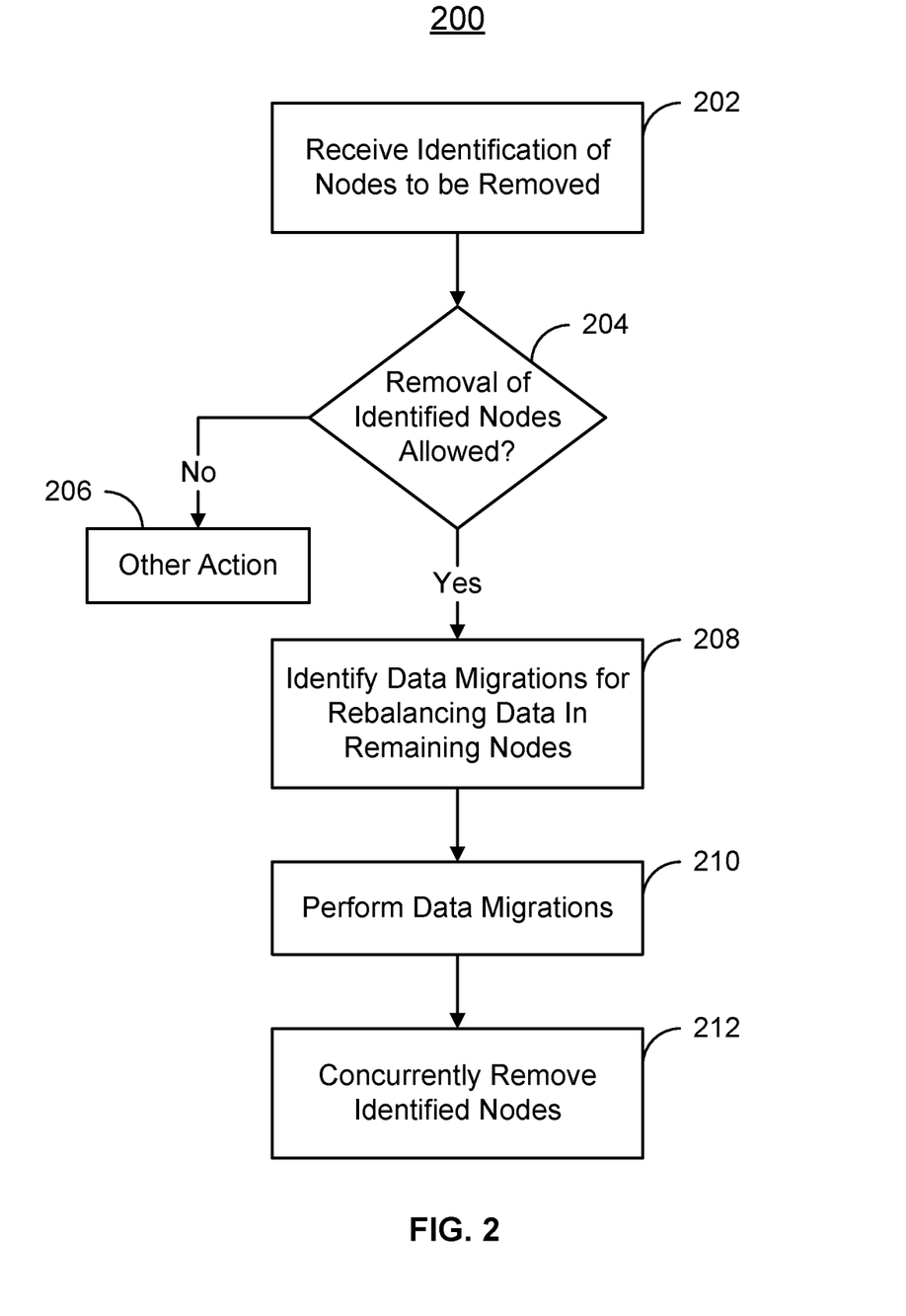
FIG. 2 is a flow chart depicting an exemplary embodiment of a method for removing multiple nodes from a storage cluster.

FIG. 2 is a flow chart depicting an exemplary embodiment of method 200 for removing multiple nodes from a storage cluster. Although individual steps are shown, each step may include one or more substeps. The steps may be performed in a different order. Additional and/or other steps not inconsistent with the method and system described herein may also be performed. Method 200 is described in the context of system 100. However, in another embodiment, method 200 may be used in connection with another storage cluster. In some embodiments, the method 200 is performed using processor(s) 182 executing instruction(s) stored in memory 184.

An identification of the nodes to be removed from storage cluster 104 is received, via 202. At 202 a user may be allowed to select multiple ones of nodes $N_1$ 110 through $N_n$ 160. For example, the user may be provided with a command from a drop down menu to remove nodes. Upon selection of the command, the user may be prompted to enter identifications for the desired nodes and/or select nodes from a list of nodes that are removable. For example, node $N_1$ 110 might not be removable either because the user does not have the authority to remove node $N_1$ 110 or because node $N_1$ 110 is not configured to be removable. In such a case, nodes $N_2$ 120 through node $N_n$ 160 might be listed in a menu as removable. Processor(s) 182 then receives the identification of nodes selected by the authorized user for removal. For the purposes of explanation, assume nodes $N_3$ 130, $N_4$ 140 and $N_n$ 160 are selected by the user for removal. Processor(s) 182 thus receive the identifications of nodes $N_3$ 130, $N_4$ 140 and $N_n$ 160 for removal.

It is determined whether to allow the removal of identified nodes $N_3$ 130, $N_4$ 140 and $N_n$ 160 from storage cluster 104, via 204. At 204, the user may be validated to determine whether the user has authority to remove nodes $N_3$ 130, $N_4$ 140 and $N_n$ 160. At 204 a determination may be made as to whether storage cluster 104 would function as desired after removal of nodes $N_3$ 130, $N_4$ 140 and $N_n$ 160. For example, it may be determined whether remaining nodes $N_1$ 110, $N_2$ 120, through $N_{n-1}$ 150 can support the data currently stored in remaining nodes $N_1$ 110, $N_2$ 120, through $N_{n-1}$ 150 and the data stored in nodes $N_3$ 130, $N_4$ 140 and $N_n$ 160 selected for removal. Other or additional determinations may be made by the processor(s) 182 to ensure that nodes $N_3$ 130, $N_4$ 140 and $N_n$ 160 may be removed.

If nodes $N_3$ 130, $N_4$ 140 and $N_n$ 160 are not allowed to be removed, then some other action is taken at 206. For example, a warning message may be provided to the user indicating that selected nodes $N_3$ 130, $N_4$ 140 and $N_n$ 160 cannot be removed. A list of nodes that might be removed instead of one or more of nodes $N_3$ 130, $N_4$ 140 and $N_n$ 160 may also be provided.

If it is determined that nodes $N_3$ 130, $N_4$ 140 and $N_n$ 160 may be removed, then the data migrations for rebalancing data in storage cluster 104 are identified, via 208. The data migrations identified at 208 include migrations of data stored in nodes $N_3$ 130, $N_4$ 140 and $N_n$ 160 selected for removal to remaining nodes $N_1$ 110, $N_2$ 120, through $N_{n-1}$ 150. In addition, data migrations between remaining nodes $N_1$ 110, $N_2$ 120, through $N_{n-1}$ 150 may be identified. Data migrations between remaining nodes $N_1$ 110, $N_2$ 120, through $N_{n-1}$ 150 may be performed to ensure that the security of the data in storage cluster 104 may be maintained.

The identified data migrations are performed, at 210. Nodes $N_3$ 130, $N_4$ 140 and $N_n$ 160 selected for removal are then concurrently removed at 212. Concurrent removal includes removing nodes $N_3$ 130, $N_4$ 140 and $N_n$ 160 as valid locations for data storage without additional user intervention and updating any relevant information in system 100. Physical removal of nodes $N_3$ 130, $N_4$ 140 and $N_n$ 160 from system 100 is not required in 212. However, because nodes are generally removed for replacement, nodes $N_3$ 130, $N_4$ 140 and $N_n$ 160 selected for removal may be physically disconnected from the system 100. In some embodiments, 212 is performed after completion of 201. Stated differently, all data migrations might be performed prior to removal of any of selected nodes $N_3$ 130, $N_4$ 140 and $N_n$ 160. Alternatively, once the data has been removed from a node $N_3$ 130, $N_4$ 140 and $N_n$ 160 selected for removal, that node may be removed. In either case, however, the nodes $N_3$ 130, $N_4$ 140 and $N_n$ 160 are removed without additional selections of nodes made by the user.

Using method 200, multiple nodes $N_3$ 130, $N_4$ 140 and $N_n$ 160 may be concurrently removed from storage cluster 104. Thus, a user need not individually track and remove nodes one-by-one. Management of storage cluster 104 is made simpler and easier.

Figure 3A:
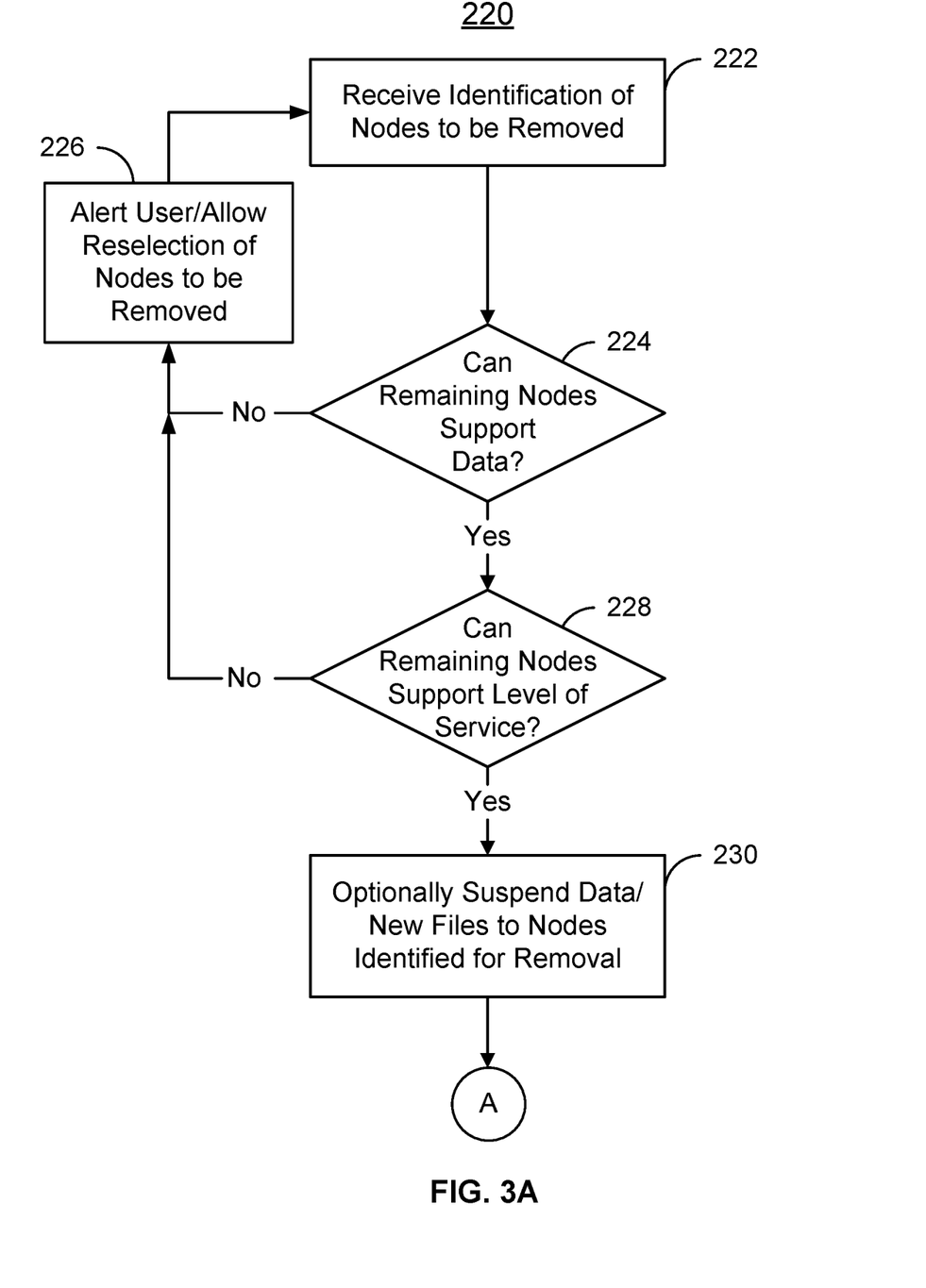
FIGS. 3A-3B depict a flow chart of an exemplary embodiment of another method for removing multiple nodes from a storage cluster.
Figure 3B:
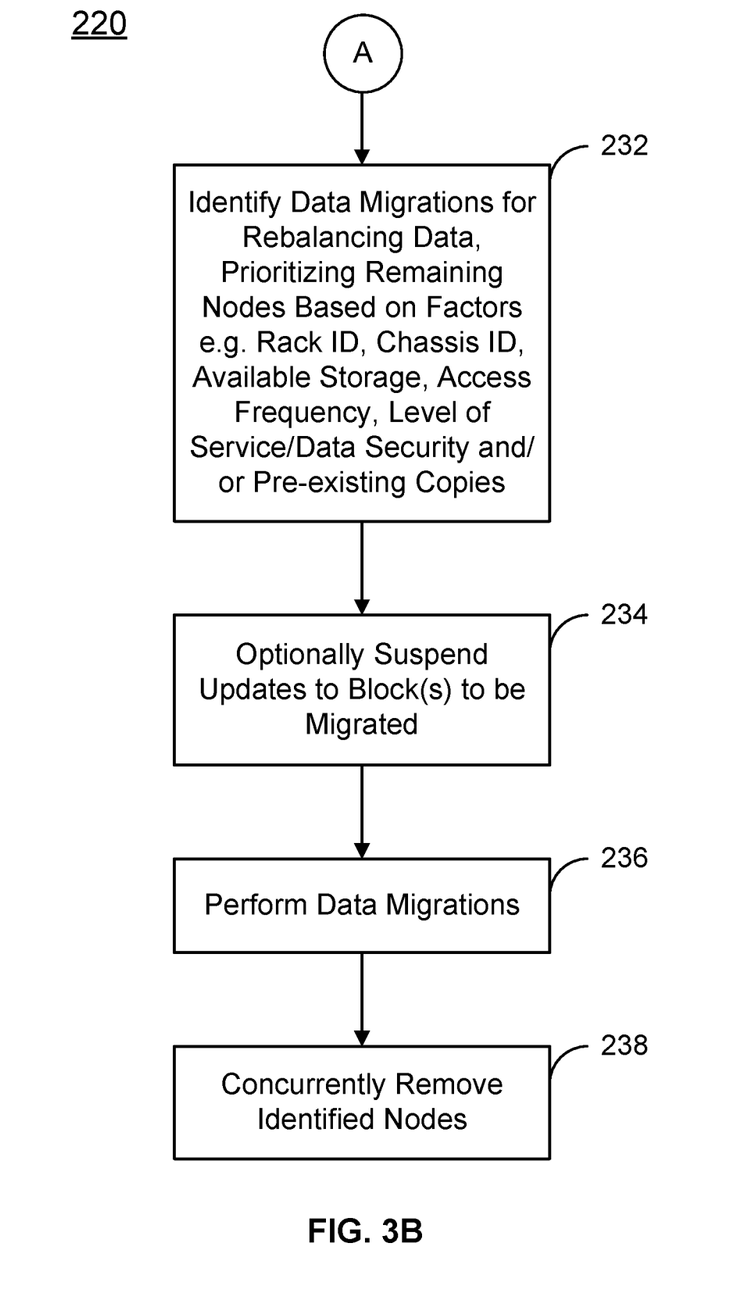

FIGS. 3A-3B are flow charts depicting an exemplary embodiment of method 220 for removing multiple nodes from a storage cluster. Although individual steps are shown, each step may include one or more substeps. At least some of the steps may be performed in a different order. Additional and/or other steps not inconsistent with the method and system described herein may be included. FIGS. 4-7 depict an exemplary embodiment of storage cluster 300 during method 200. Storage cluster 300 may be part of a secondary storage system, such as the secondary storage system 100. Thus, method 220 is described in the context of storage cluster 300. However, in another embodiment, method 220 may be used in connection with another storage cluster. For clarity, any processor(s) and memory used in carrying out the method 220 are not shown.

Figure 4:
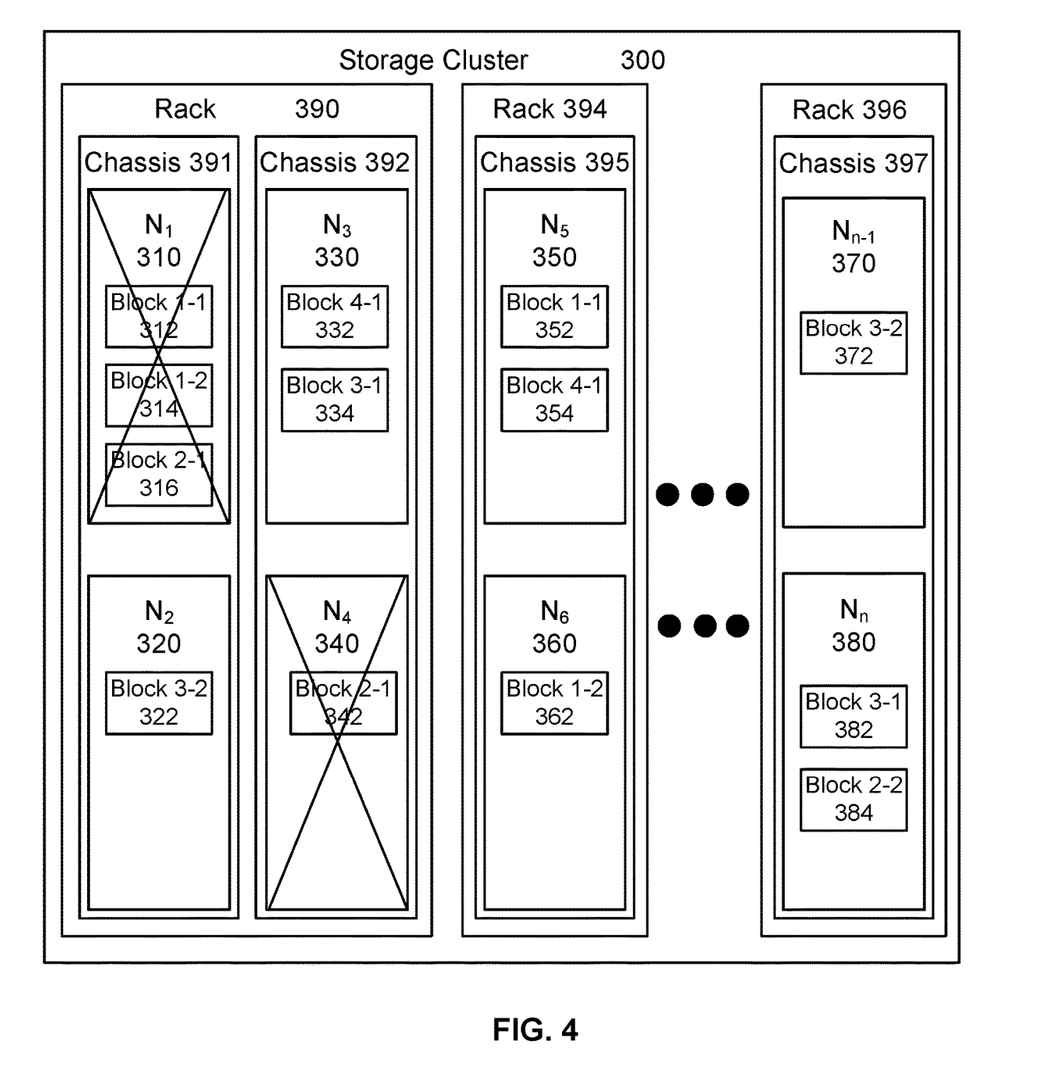
FIGS. 4-7 depict an exemplary embodiment of a storage cluster during removal of multiple nodes.

As can be seen in FIG. 4, storage cluster 300 includes nodes $N_1$ 310, $N_2$ 320, $N_3$ 330, $N_4$ 340, $N_5$ 350, $N_6$ 360, through $N_{n-1}$ 370 and $N_n$ 380; chassis 392, 392, 395 through 397; and racks 390, 394 through 396. For simplicity, only three racks and four chassis are shown and labeled. However, m racks (which is shown as less than or equal to n) and k chassis (which is less than or equal to n and m) may be present. For simplicity, each chassis 391, 392, 395 through 397 is shown as including two nodes. Similarly, each rack 390, 394 through 396 is shown as including not more than two chassis. However, each rack 390, 394 through 396 may include a different number of chassis. Typically, a larger number of chassis reside in each rack 390, 394 through 396. Each chassis 391, 392, 395 through 397 may include a different number of nodes. In addition, each node 310, 320, 330, 340, 350, 350 through 370 and 380 generally includes multiple hard disk drives, solid state drives or combination thereof, which are not shown for simplicity.

Each node also stores one or more blocks from different sources/files. Node $N_1$ 310 stores blocks of data from two sources/files. Thus, node $N_1$ 310 stores block 1-1 312 and block 1-2 314 from a first source/file as well as block 2-1 316 from a second source/file. Node $N_2$ 320 stores block 3-2 322 from a third source/file. Node $N_3$ 330 stores block 4-1 332 from a fourth source/file and block 3-1 334 from the third source/file. Node $N_4$ 340 stores block 2-1 342 from the second source/file. Block 2-1 342 and block 2-1 316 thus contain the same data. Node $N_5$ 350 stores block 1-1 352 from the first source/file and block 4-1 354 from the fourth source/file. Block 1-1 352 and block 4-1 354 thus contain the same data as 1-1 block 312 and block 4-1 332, respectively. Node $N_6$ 360 stores block 1-2 262 from the first source/file.

Node $N_{n-1}$ 370 stores block 3-2 372 from the second source/file. Block 3-2 372 includes the same data as block 3-2 322. Node $N_n$ 380 stores block 3-1 382 from the third source/file and block 2-2 384 from the second source/file. Block 3-1 382 contains the same data as block 3-1 334. Thus, first source/file includes two blocks (1-1 and 1-2), second source/file includes one block (2-1), third source/file includes two blocks (3-1 and 3-2) and fourth source/file includes one block (4-1). Storage cluster 300 stores redundant copies of at least some of the blocks. Hereinafter, blocks are described by their label only, without indication as to the block number and source file. For example, block 1-1 312 is referred to hereinafter as block 312.

An identification of the nodes to be removed from storage cluster 300 is received, at 222. A user may be allowed to select multiple ones of nodes $N_1$ 310 through $N_n$ 380 for removal in 222. Operations performed at 222 are thus analogous to those performed at 202. As can be seen in FIG. 4, because nodes $N_1$ 310 and $N_4$ 340 are selected by the user for removal, the nodes $N_1$ 310 and $N_4$ 340 have been crossed out.

It is determined whether remaining nodes $N_2$ 320, $N_3$ 330, $N_5$ 350, $N_6$ 360 through $N_{n-1}$ 370 and $N_n$ 380 can support data already stored in cluster 300, via 224. Thus, it is determined whether remaining nodes $N_2$ 320, $N_3$ 330, $N_5$ 350, $N_6$ 360 through $N_{n-1}$ 370 and $N_n$ 380 can store at least not only blocks 322, 332, 334, 352, 354, 362, through 372, 382 and 384, but also blocks 312, 314, 316 and 342 from nodes $N_1$ 310 and $N_4$ 340 selected for removal.

If remaining nodes $N_2$ 320, $N_3$ 330, $N_5$ 350, $N_6$ 360 through $N_{n-1}$ 370 and $N_n$ 380 cannot store the data, then the user is alerted, at 226. The user is made aware that the nodes $N_1$ 310 and $N_4$ 340 cannot both be removed. Also at 226 a user may be allowed to reselect nodes for removal. For example, the alert may indication that only node $N_1$ 310 or only node $N_2$ 340 may be removed. The alert may also provide other combination(s) of nodes that might be removed together. For example, nodes $N_1$ 310 and Node $N_2$ 320 or nodes $N_4$ 340 and $N_6$ 350 might be suggested as possible alternate nodes for removal. The user may also be allowed to opt to select nodes suggested in 224 and/or input the identity of another combination of nodes that may be removed, If it is determined in 224 that remaining node $N_2$ 320, $N_3$ 330, $N_5$ 350, $N_6$ 360 through $N_{n-1}$ 370 and $N_n$ 380 can support the data already stored in the cluster 220, then it is determined whether remaining nodes $N_2$ 320, $N_3$ 330, $N_5$ 350, $N_6$ 360 through $N_{n-1}$ 370 and $N_n$ 380 can support the desired level(s) of service, via 228. It may be determined at 228 whether there is sufficient storage and accessibility in remaining nodes $N_2$ 320, $N_3$ 330, $N_5$ 350, $N_6$ 360 through $N_{n-1}$ 370 and $N_n$ 380 to provide the desired level of security for additional data to be stored in storage cluster 300. For example, it may be determined whether remaining nodes $N_2$ 320, $N_3$ 330, $N_5$ 350, $N_6$ 360 through $N_{n-1}$ 370 and $N_n$ 380 are capable of supporting a particular access frequency. It may also be determined whether remaining nodes $N_2$ 320, $N_3$ 330, $N_5$ 350, $N_6$ 360 through $N_{n-1}$ 370 and $N_n$ 380 include sufficient available storage for the data to be migrated. In 228, therefore, it can be determined whether storage cluster 300 can operate as desired after nodes $N_1$ 310 and $N_4$ 340 have been removed. 224 and 228 may thus be considered to be analogous to 204 of method 200, which determines whether the selected nodes are allowed to be removed.

If it is determined at 228 that the desired level(s) of service cannot be maintained with only nodes $N_2$ 320, $N_3$ 330, $N_5$ 350, $N_6$ 360 through $N_{n-1}$ 370 and $N_n$ 380 remaining after nodes $N_1$ 310 and $N_4$ 340 have been removed, then 226 is returned to. Thus, the user is informed that nodes $N_1$ 310 and $N_4$ 340 selected for removal are not allowed to be removed. The user may also be provided with additional information that may assist the user in selecting other node(s) for removal or otherwise managing storage cluster 300. The user may also be allowed to identify other node(s) for removal.

If it is determined in 228 that the desired level(s) of service can be supported using only remaining nodes $N_2$ 320, $N_3$ 330, $N_5$ 350, $N_6$ 360 through $N_{n-1}$ 370 and $N_n$ 380, then storage accesses to nodes $N_1$ 310 and $N_4$ 340 identified for removal may optionally be partially or wholly suspended, at 230. In some embodiments, nodes $N_1$ 310 and $N_4$ 340 are suspended with respect to storage of new data only. As a result, new blocks of data are not stored in nodes $N_1$ 310 and $N_4$ 340. Consequently, any new data are stored in nodes $N_2$ 320, $N_3$ 330, $N_5$ 350, $N_6$ 360 through $N_{n-1}$ 370 and $N_n$ 380 that will remain after removal of nodes $N_1$ 310 and $N_4$ 340. However, updates to blocks 312, 314, 316 and 342 already stored on nodes $N_1$ 310 and $N_4$ 340 may still be allowed. In another embodiment, all data accesses to nodes $N_1$ 310 and $N_4$ 340 identified for removal are halted at 230. However, such an embodiment may be less desirable as the consistency between blocks on nodes $N_1$ 310 and $N_4$ 340 selected for removal and remaining nodes $N_2$ 320, $N_3$ 330, $N_5$ 350, $N_6$ 360 through $N_{n-1}$ 370 and $N_n$ 380 may be challenging to maintain. For example, block 352 might be updated after 230, while block 312 would not be updated. In another embodiment, step 230 may be omitted. In such an embodiment, nodes $N_1$ 310 and $N_4$ 340 continue to function normally.

Data migrations that account for the removal of nodes $N_1$ 310 and $N_4$ 340 and which rebalance the data are identified, at 232. This may include accounting for various inputs in data rebalancing. Such inputs may include one or more of the rack identification, the chassis identification, the available storage, the access frequency and other characteristics of each remaining node $N_2$ 320, $N_3$ 330, $N_5$ 350, $N_6$ 360 through $N_{n-1}$ 370 and $N_n$ 380 as well as the nodes $N_1$ 310 and $N_4$ 340 identified for removal. Inputs in identifying the data migrations might include factors relating to data being stored, such as the level of service or security for the data; the number of copies required to be stored; whether copies can be stored on the same node, rack or chassis; and whether copies of the data stored on nodes $N_1$ 310 and $N_4$ 340 identified for removal are already stored on remaining nodes $N_2$ 320, $N_3$ 330, $N_5$ 350, $N_6$ 360 through $N_{n-1}$ 370 and $N_n$ 380. Different and/or additional factors might also be considered in identifying the data migrations. The chassis identification may be a consideration in identifying data migrations because it may be desirable to store redundant copies of data on different chassis. Chassis identification may also be used to ensure that data from nodes $N_1$ 310 and $N_4$ 340 being removed are not stored on another node on the same chassis. Rack identification might be used in a similar manner. The level of service or security may affect the redundancy (number of copies of data stored) as well as whether redundant copies may be stored on the same node, rack or chassis. Available storage and how frequently a node is accessed also affect its ability to accept and/or efficiently store data migrations from another node. The above factors affect not only whether a particular data migration may be performed, but also the priority of data migrations. Thus, using some or all of these factors, and/or possibly other considerations, the migrations to be performed to rebalance the data among remaining nodes $N_2$ 320, $N_3$ 330, $N_5$ 350, $N_6$ 360 through $N_{n-1}$ 370 and $N_n$ 380 are identified and prioritized.

Figure 5:
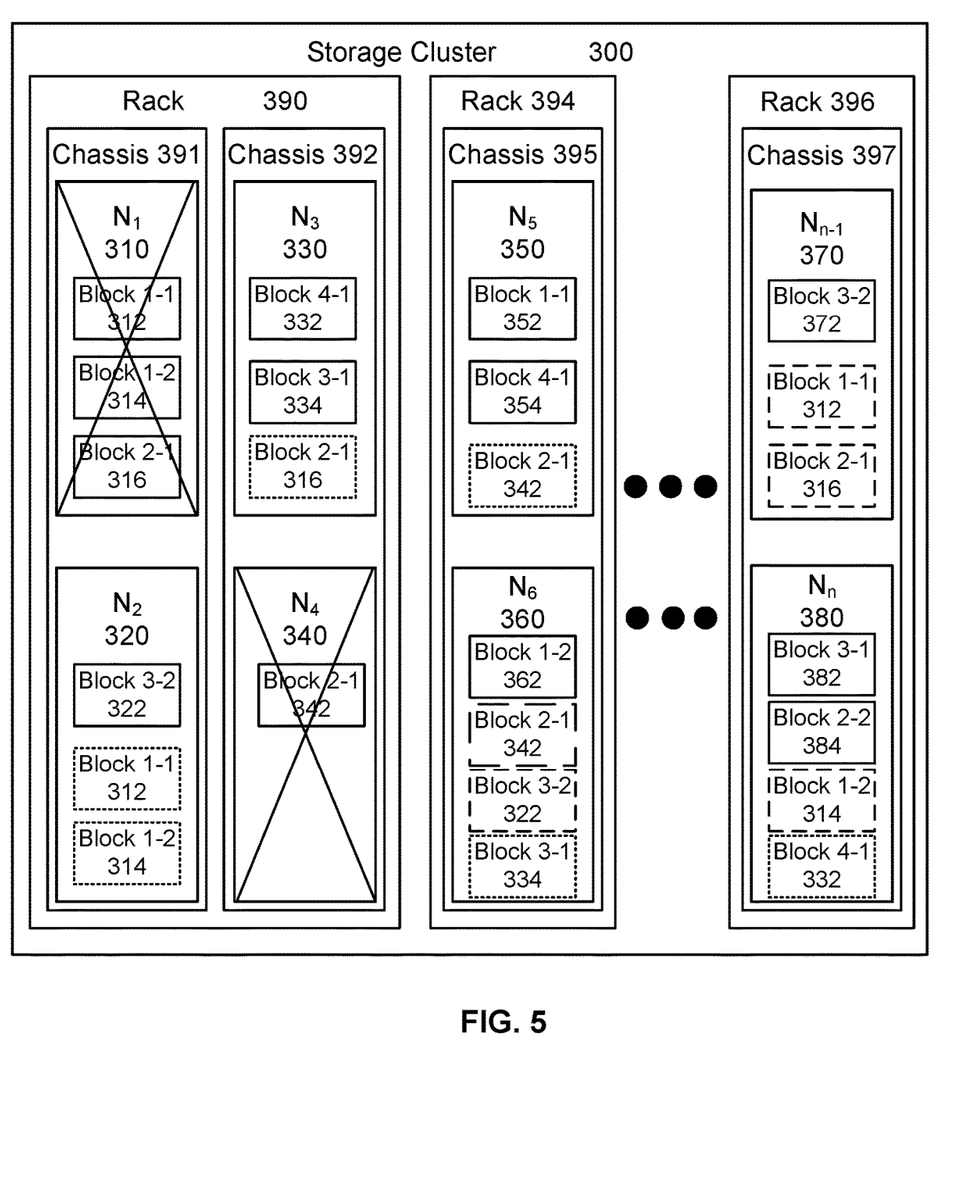

FIG. 5, for example, depicts storage system 300 during 232 of method 220. In this embodiment, dashed and dotted lines for certain blocks indicate possible data migrations of different priority. Blocks having dotted lines are of lower priority or less desirable than those having dashed lines in FIG. 5. In FIG. 5, block 312 and block 316 having dashed lines are shown in node $N_{n-1}$ 370. Block 314 having dashed lines is shown on node $N_n$ 380. These are potential data migrations from node $N_1$ 310. In contrast, blocks 312 and 314 and block 316 having dotted lines are shown on nodes $N_2$ 320 and $N_3$ 330, respectively. As indicated in FIG. 5, blocks 312, 314 and 316 on nodes $N_2$ 320 and $N_3$ 330 have lower priority (dotted lines) or are less desirable migrations. This is because node $N_2$ 320 is on the same chassis 391 and the same rack 390 as node $N_1$ 310 being removed and from which the blocks 312 and 314 originate. Similarly, node $N_3$ 330 is on the same rack 390 as node $N_1$ 310 being removed and from which block 316 originates. It is also possible that nodes $N_{n-1}$ 370 and $N_n$ 380 have a greater amount of storage and/or a lower access frequency, which may increase the likelihood that data are migrated to nodes $N_{n-1}$ 370 and $N_n$ 380. Similarly, block 342 is shown with a dashed line in node $N_6$ 360 and a (lower priority/desirability) dotted line on node $N_5$ 350. These are possible data migrations because both nodes $N_5$ 350 and $N_6$ 360 are on a different rack 394 and chassis 395 than nodes $N_1$ 310 and $N_4$ 340 being removed. Block 342 may have higher priority/desirability on node $N_6$ 360 because node $N_6$ 360 may have greater storage available and/or a lower access frequency. Dashed block 322 and dotted block 334 on node $N_6$ 360 are shown as possible migrations from nodes $N_2$ 320 and $N_3$ 330 even though these nodes are not being removed. However, nodes $N_2$ 320 and $N_3$ 330 are on the same chassis 391 and 392 and rack 390 as the nodes $N_1$ 310 and $N_4$ 340 identified for removal. It may be desirable to migrate data on the same rack and/or chassis as nodes $N_2$ 320 and $N_3$ 330 being removed. Thus, various factors may be taken into account in determining the priority of possible data migrations.

Figure 6:
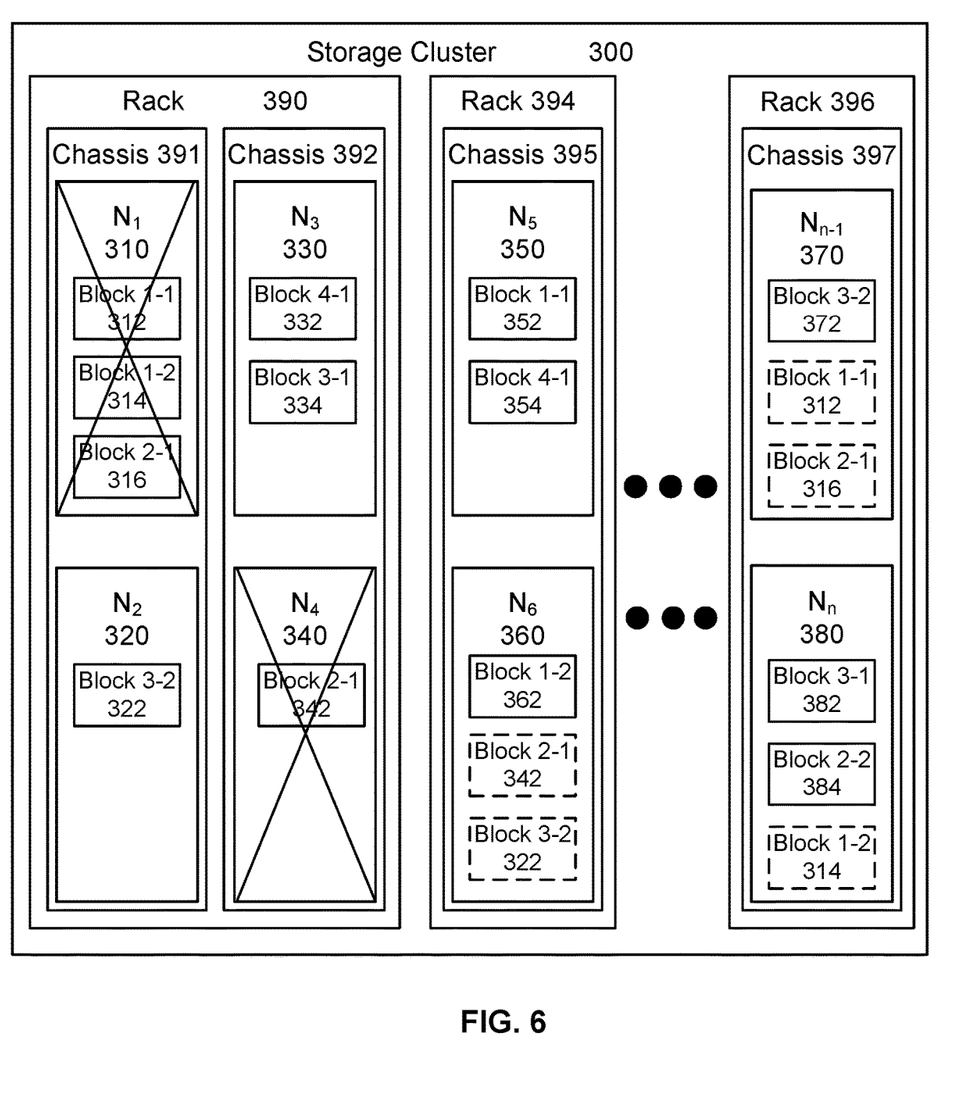

FIG. 6 depicts storage cluster 300 after the migrations to be performed have been selected as part of 232. Thus, most of the lower priority/desirability migrations (dotted lines in FIG. 5) have been removed. As can be seen in FIG. 6, the migrations to be performed are blocks 312 and 316 migrated from node $N_1$ 310 to node $N_{n-1}$ 370; block 314 from node $N_1$ 310 to node $N_n$ 380; block 342 from node $N_4$ 340 to node $N_6$ 360; and block 322 from node $N_2$ 320 to node $N_6$ 360. In the embodiment shown, therefore, data are migrated not only from nodes $N_1$ 310 and $N_4$ 340 to be removed, but also from node $N_2$ 320 on the same rack and chassis as node $N_1$ 310 to be removed. Although blocks 322, 342, 312, 314 and 316 on nodes $N_6$ 360, $N_{n-1}$ 370 and $N_n$ 380 are all shown as dashed lines, the blocks 322, 342, 312, 314 and 316 generally do not have equal priorities.

Updates for blocks 312, 314, 316 and 342 to be migrated from nodes $N_1$ 310 and $N_4$ 340 identified for removal may optionally be suspended at 234. This suspension prevents changes while the blocks 312, 314, 316 and 342 are transferred. However, 234 may be omitted if all data operations to nodes $N_1$ 310 and $N_4$ 340 selected for removal were terminated at 230. The identified data migrations are performed, at 236. Thus, blocks 312, 314, 316, 322 and 342 data are moved according to their priorities. Blocks 312, 314, 316, and 342 that are to be migrated do not receive updates just before and during migration. In some embodiments, 234 and 236 may be interleaved. For example, updates to block 312 may be suspended at 234 and block 312 migrated at 236. Updates to block 314 may then be suspended and block 314 migrated, and so on. Thus, updates to a block may only be paused prior to migration of that block. In some embodiments, migration of a single block may require multiple steps. In such an embodiment, updates may be suspended at 234 for a block only after some steps in migration at 236 have been performed. For example, a block 312, 314, 316 and/or 342 may be broken into sub-blocks for migration. In such an embodiment, 234 may suspend updates to the next sub-block to be migrated. Similarly, migration might involve identification of underlying data files or other operations. In such an embodiment, updates may be suspended at 234 after at least some of such operations are performed. In another embodiment, updates to all blocks 312, 314, 316 and 342 to be migrated are suspended and then all blocks 312, 314, 316 and 342 migrated to their target nodes. Thus, updates to blocks 312, 314, 316 and 342 and/or nodes $N_1$ 310 and $N_4$ 340 may be suspended prior to migration. After migration is completed, updates to the migrated blocks 312, 314, 316 and 342 may be restarted. Further, any updates to the bocks 312, 314, 316 and 342 occurring during transfer/migration are applied to the blocks 312, 314, 316 and/or 342 after the blocks 312, 314, 316 and/or 342 are stored on their target node.

Nodes $N_1$ 310 and $N_4$ 340 selected for removal are concurrently removed at 238. Concurrent removal includes removing nodes $N_1$ 310 and $N_4$ 340 as valid locations for data storage without additional user intervention and updating any relevant information in system 100. Physical removal of nodes $N_1$ 310 and $N_4$ 340 from system 300 can but need not be performed at 238. As discussed above, 238 may be performed after all of the data migrations have been completed in 236. Alternatively, as data are migrated off of a node, that node may be removed. Although a user might be updated each time a node is removed, the user need not intervene to ensure that all of the selected nodes $N_1$ 310 and $N_4$ 340 are removed.

Figure 7:
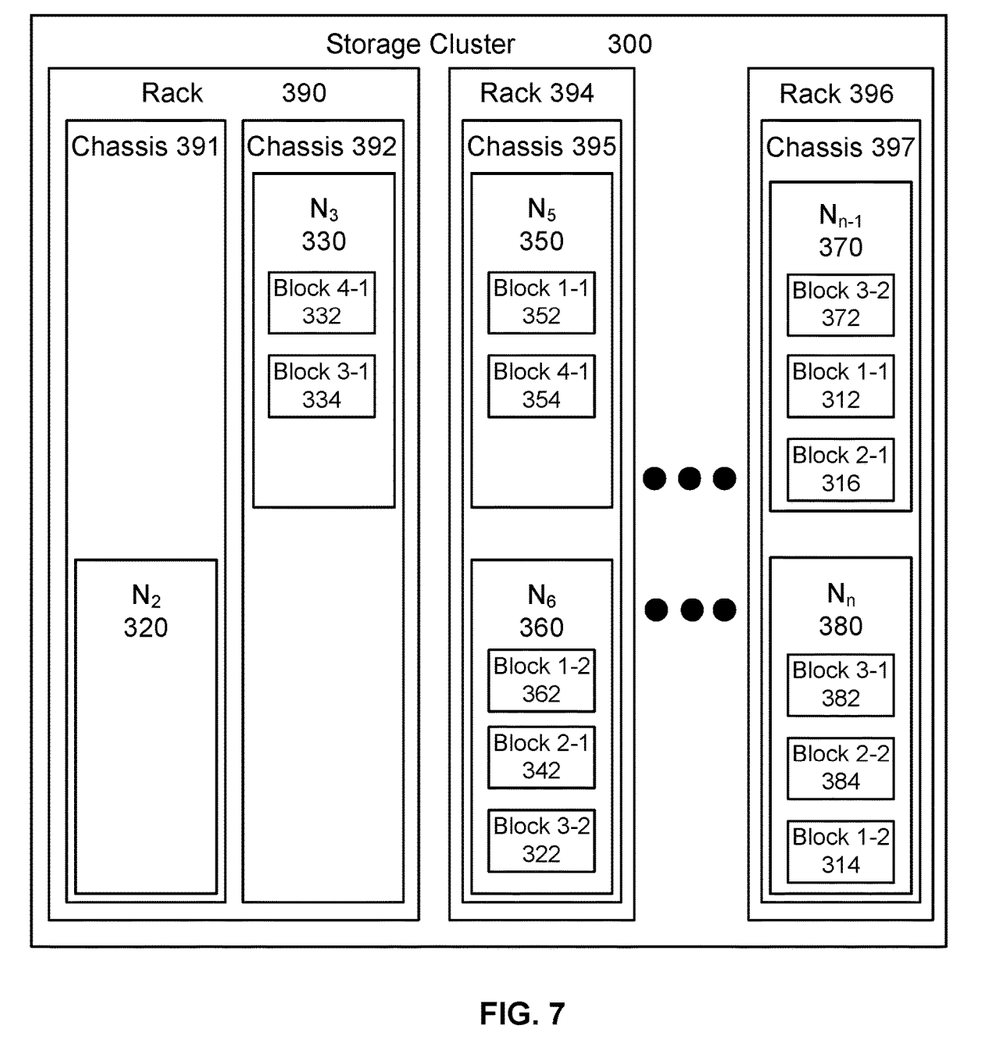

FIG. 7 depicts storage cluster 300 after 238 has been performed. Nodes $N_1$ 310 and $N_4$ 340 have been removed from the cluster 300. Data from these nodes has been migrated to other nodes $N_6$ 360, $N_{n-1}$ 370 and $N_n$ 380. In addition, data previously stored in node $N_2$ 320 sharing a chassis 391 and rack 390 as the node $N_1$ 310 identified for removal has been migrated to a different node N6 360 that shares neither a rack nor a chassis with a node being removed.

Using method 220, multiple nodes $N_1$ 310 and $N_4$ 330 may be concurrently removed from storage cluster 300. Thus, a user need not individually track and remove nodes one-by-one. Further, data may be migrated between remaining nodes 320, 330, 340, 350, 3660, 370 and 380. Management of storage cluster 300 is made simpler and easier. Remaining nodes $N_2$ 320, $N_3$ 330, $N_5$ 350, $N_6$ 360 through $N_{n-1}$ 370 and $N_n$ 380 may then take over storage tasks for storage cluster 300. Further, because updates on blocks to be migrated may only be suspended just before or during migration. Consequently, the transfer of data between nodes may be more efficient. Thus, management of storage cluster 300 may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an identification of a plurality of nodes of a storage cluster to be removed from the storage cluster, the plurality of nodes storing data;
determining whether to allow the removal of the plurality of nodes of the storage cluster;
in response to a determination that the removal of the plurality of nodes of the storage cluster is allowed, identifying data migrations to be performed to rebalance the data among nodes remaining in the storage cluster after the plurality of nodes are removed, wherein the identifying the data migrations to be performed further includes:
assigning the nodes remaining in the storage cluster corresponding migration priorities, wherein a migration priority is based in part on a chassis or a rack on which a node remaining in the storage cluster is located; and
selecting, based on the corresponding migration priorities, one or more of the nodes remaining in the storage cluster, wherein the one or more selected nodes are located on a different chassis or a different rack than the plurality of nodes to be removed;
performing the data migrations to the one or more selected nodes; and
concurrently removing the plurality of nodes from the storage cluster.

2. The method of claim 1, wherein the removing the plurality of nodes from the storage cluster is performed after the performing the data migrations.

3. The method of claim 1, wherein the determining whether to allow removal of the plurality of nodes further includes determining whether the nodes remaining in the storage cluster can support the data being rebalanced.

4. The method of claim 3, wherein the storage cluster supports at least one level of service and wherein the determining whether to allow the removal of the plurality of nodes further includes determining whether the nodes remaining in the storage cluster can support the at least one level of service.

5. The method of claim 1, further comprising:
in response to the determination that the removal of the plurality of nodes is allowed, suspending storage of additional data in the plurality of nodes.

6. The method of claim 1, wherein the identifying the data migrations further includes:
assigning the nodes remaining the corresponding migration priorities based in part on a plurality of inputs including corresponding available storage and corresponding access frequency for each of the nodes remaining.

7. The method of claim 6 wherein the plurality of inputs further includes a corresponding rack identification and a corresponding chassis identification for each of the nodes remaining.

8. The method of claim 6 wherein the plurality of inputs includes an identification of any additional copies of at least a portion of the data already on each of the nodes remaining, such that not more than one copy of the data is stored on each of the nodes remaining.

9. A system for managing a storage cluster, comprising:
a processor configured to:
receive an identification of a plurality of nodes of the storage cluster to be removed from the storage cluster, the plurality of nodes storing data;
determine whether to allow the removal of the plurality of nodes of the storage cluster;
in response to a determination that the removal of the plurality of nodes of the storage cluster is allowed, identify data migrations to be performed to rebalance the data among nodes remaining in the storage cluster after the plurality of nodes are removed, wherein to identifying the data migrations to be performed, the processor is further configured to:
assign the nodes remaining in the storage cluster corresponding migration priorities, wherein a migration priority is based in part on a chassis or a rack on which a node remaining in the storage cluster is located; and
select, based on the corresponding migration priorities, one or more of the nodes remaining in the storage cluster, wherein the one or more selected nodes are located on a different chassis or a different rack than the plurality of nodes to be removed;
perform the data migrations to the one or more selected nodes; and
concurrently remove the plurality of nodes from the storage cluster; and
a memory coupled to the processor and configured to provide the processor with instructions.

10. The system of claim 9, wherein the processor removing the plurality of nodes from the storage cluster is performed after the performing the data migrations.

11. The system of claim 9, wherein the processor is further configured to determine whether the nodes remaining in the storage cluster can support the data being rebalanced as part of determining whether to allow removal of the plurality of nodes.

12. The system of claim 11, wherein the storage cluster supports at least one level of service and wherein the processor is configured to determine whether the nodes remaining in the storage cluster can support the at least one level of service as part of determining whether to allow the removal of the plurality of nodes.

13. The system of claim 9, wherein the processor is further configured to
suspend storage of additional data in the plurality of nodes in response to the determination that the removal of the plurality of nodes is allowed.

14. The system of claim 9, wherein to identify data migrations to be performed, the processor is further configured to
assign the nodes remaining a corresponding migration priorities based on a plurality of inputs including corresponding available storage and corresponding access frequency for each of the nodes remaining.

15. The system of claim 14 wherein the plurality of inputs further includes a corresponding rack identification and a corresponding chassis identification for each of the nodes remaining.

16. The system of claim 14 wherein the plurality of inputs includes an identification of any additional copies of at least a portion of the data already on each of the nodes remaining, such that not more than one copy of the data is stored on each of the nodes remaining.

17. A system for managing a storage cluster, comprising:
a processor; and
a memory coupled with the processor, wherein the memory is configured to provide the processor with instructions which when executed cause the processor to:

receive an identification of a plurality of nodes of the storage cluster to be removed from the storage cluster, the plurality of nodes storing data;

determine whether to allow the removal of the plurality of nodes of the storage cluster;

in response to a determination that the removal of the plurality of nodes of the storage cluster is allowed, identify data migrations to be performed to rebalance the data among nodes remaining in the storage cluster after the plurality of nodes are removed, wherein to identify the data migrations to be performed further includes instructions to:

assign the nodes remaining in the storage cluster corresponding migration priorities, wherein a migration priority is based in part on a chassis or a rack on which a node remaining in the storage cluster is located; and select, based on the corresponding migration priorities, one or more of the nodes remaining in the storage cluster, wherein the one or more selected nodes are located on a different chassis or a different rack than the plurality of nodes to be removed;

perform the data migrations to the one or more selected nodes; and concurrently remove the plurality of nodes to be removed from the storage cluster.

18. A computer program product for managing a storage cluster, the computer program product being embodied in a nontransitory computer readable storage medium and comprising computer instructions for:

receiving an identification of a plurality of nodes of the storage cluster to be removed from the storage cluster, the plurality of nodes storing data;

determining whether to allow the removal of the plurality of nodes of the storage cluster;

in response to a determination that the removal of the plurality of nodes of the storage cluster is allowed, identifying data migrations to be performed to rebalance the data among nodes remaining in the storage cluster after the plurality of nodes are removed, wherein the identifying the data migrations to be performed further includes:

assigning the nodes remaining in the storage cluster corresponding migration priorities, wherein a migration priority is based in part on a chassis or a rack on which a node remaining in the storage cluster is located; and selecting, based on the corresponding migration priorities, one or more of the nodes remaining in the storage cluster, wherein the one or more selected nodes are located on a different chassis or a different rack than the plurality of nodes to be removed;

performing the data migrations to the one or more selected nodes; and concurrently removing the plurality of nodes from the storage cluster.

19. The method of claim 1 wherein the received identification is received from a user.

20. The method of claim 19, wherein the storage cluster is a secondary storage cluster and wherein the determining whether to allow removal of the plurality of nodes further includes:

determining at least one of whether the nodes remaining in the storage cluster can support the data after the removal of the plurality of nodes, whether the nodes remaining in the storage cluster can provide a current level of service after the removal of the plurality of nodes, and whether the user providing the identification of the plurality of nodes to be removed is authorized to remove the plurality of nodes; and in response to determining that at least one of the remaining portion of the storage cluster cannot support the stored data, the remaining portion of the storage cluster cannot provide the current level of service after removal of the plurality of nodes, and the user is not authorized to provide the identification of the plurality nodes to be removed, prompting the user for a selection of a second plurality of nodes for removal.

21. The system of claim 9, wherein the received identification is received from a user.

22. The system of claim 21, wherein the storage cluster is a secondary storage cluster and wherein to determine whether to allow removal of the plurality of nodes the processor is further configured to:

determine at least one of whether the nodes remaining in the storage cluster can support the data after the removal of the plurality of nodes, whether the nodes remaining in the storage cluster can provide a current level of service after the removal of the plurality of nodes, and whether the user providing the identification of the plurality of nodes to be removed is authorized to remove the plurality of nodes; and in response to a determination that at least one of the remaining portion of the storage cluster cannot support the stored data, the remaining portion of the storage cluster cannot provide the current level of service after removal of the plurality of nodes, and the user is not authorized to provide the identification of the plurality nodes to be removed, prompt the user for a selection of a second plurality of nodes for removal.

23. The system of claim 17 wherein the received identification is received from a user.

24. The system of claim 23, wherein the storage cluster is a secondary storage cluster, and wherein to determine whether to allow removal of the plurality of nodes the memory is configured to provide the processor with instructions which when executed cause the processor to:

determine at least one of whether the nodes remaining in the storage cluster can support the data after the removal of the plurality of nodes, whether the nodes remaining in the storage cluster can provide a current level of service after the removal of the plurality of nodes, and whether the user providing the identification of the plurality of nodes to be removed is authorized to remove the plurality of nodes; and in response to a determination that at least one of the remaining portion of the storage cluster cannot support the stored data, the remaining portion of the storage cluster cannot provide the current level of service after removal of the plurality of nodes, and the user is not authorized to provide the identification of the plurality nodes to be removed, prompt the user for a selection of a second plurality of nodes for removal.

25. The computer program product of claim 18, wherein the received identification is received from a user.

26. The computer program product of claim 25, wherein the storage cluster is a secondary storage cluster, wherein the plurality of nodes includes stored data and wherein the instructions for determining whether to allow removal of the plurality of nodes further include instructions for:

determining at least one of whether the nodes remaining in the storage cluster can support the data after the removal of the plurality of nodes, whether the nodes remaining in the storage cluster can provide a current level of service after the removal of the plurality of nodes, and whether the user providing the identification of the plurality of nodes to be removed is authorized to remove the plurality of nodes; and in response to determining that at least one of the remaining portion of the storage cluster cannot support the stored data, the remaining portion of the storage cluster cannot provide the current level of service after removal of the plurality of nodes, and the user is not authorized to provide the identification of the plurality nodes to be removed, prompting the user for a selection of a second plurality of nodes for removal.

* * * * *

UNITED STATES PATENT AND TRADEMARK OFFICE
CERTIFICATE OF CORRECTION

PATENT NO. : 10,613,780 B1
APPLICATION NO. : 16/155796
DATED : April 7, 2020
INVENTOR(S) : Sharath Kumar Naeni et al.

Page 1 of 1

It is certified that error appears in the above-identified patent and that said Letters Patent is hereby corrected as shown below:

In the Specification

In Column 5, Line(s) 43, after "removed", delete "," and insert --.--, therefor.

In the Claims

In Column 9, Line(s) 54, Claim 7, after "claim 6", insert --,--.
In Column 9, Line(s) 58, Claim 8, after "claim 6", insert --,--.
In Column 10, Line(s) 53, Claim 15, after "claim 14", insert --,--.
In Column 10, Line(s) 57, Claim 16, after "claim 14", insert --,--.
In Column 11, Line(s) 57, Claim 19, after "claim 1", insert --,--.
In Column 12, Line(s) 34, Claim 23, after "claim 17", insert --,--.

Signed and Sealed this
Sixth Day of October, 2020

Andrei Iancu
*Director of the United States Patent and Trademark Office*